(No Model.)

G. HIRSCHMAN.
BEER FAUCET AND TAP.

No. 264,457.  Patented Sept. 19, 1882.

Attest.
Sidney P. Hollingsworth
Walter S. Dodge.

Inventor.
George Hirschman,
by Dodge & Son,
Attys.

UNITED STATES PATENT OFFICE.

GEORGE HIRSCHMAN, OF MORRISTOWN, NEW JERSEY, ASSIGNOR OF ONE-HALF TO JOHN HEGEMAN, OF SAME PLACE.

BEER FAUCET AND TAP.

SPECIFICATION forming part of Letters Patent No. 264,457, dated September 19, 1882.

Application filed March 9, 1882. (No model.)

*To all whom it may concern:*

Be it known that I, GEORGE HIRSCHMAN, of Morristown, in the county of Morris and State of New Jersey, have invented certain Improvements in Beer Faucets and Taps, of which the following is a specification.

My invention relates to devices for tapping barrels and casks; and it consists in a sleeve adapted to be screwed or otherwise attached to a metal bushing surrounding the plug or bung, and a shouldered faucet arranged to move a limited distance longitudinally within the sleeve, so that if forced back by the pressure of the liquid it can move only such limited distance, but is held in position to be driven to its place.

The invention further consists in a peculiar construction and arrangement of the bushing, as hereinafter explained.

Figure 1:
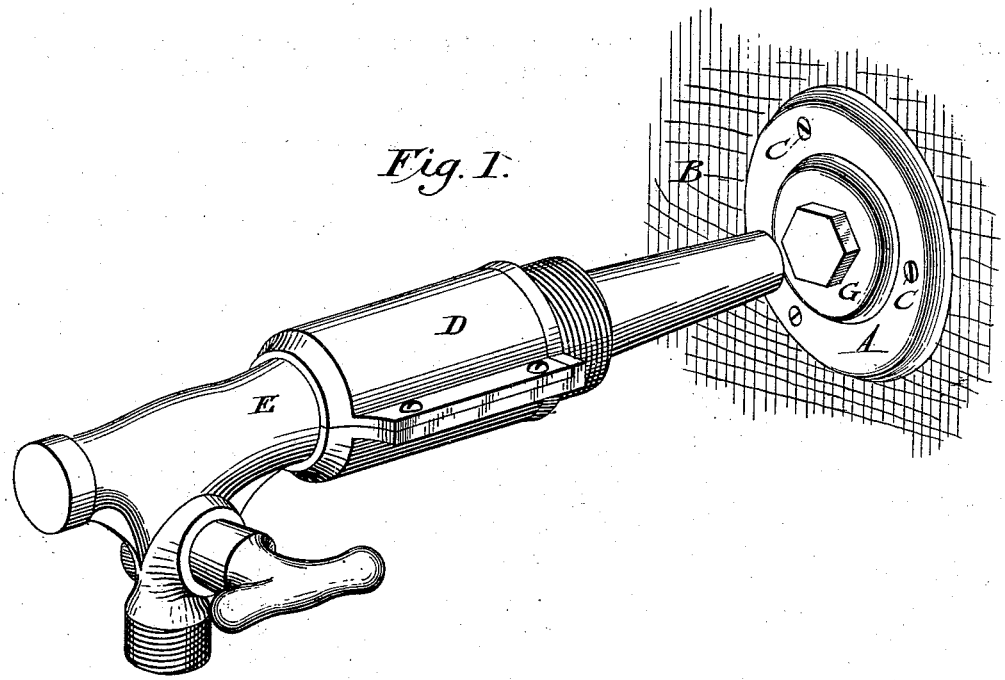
Figure 2:
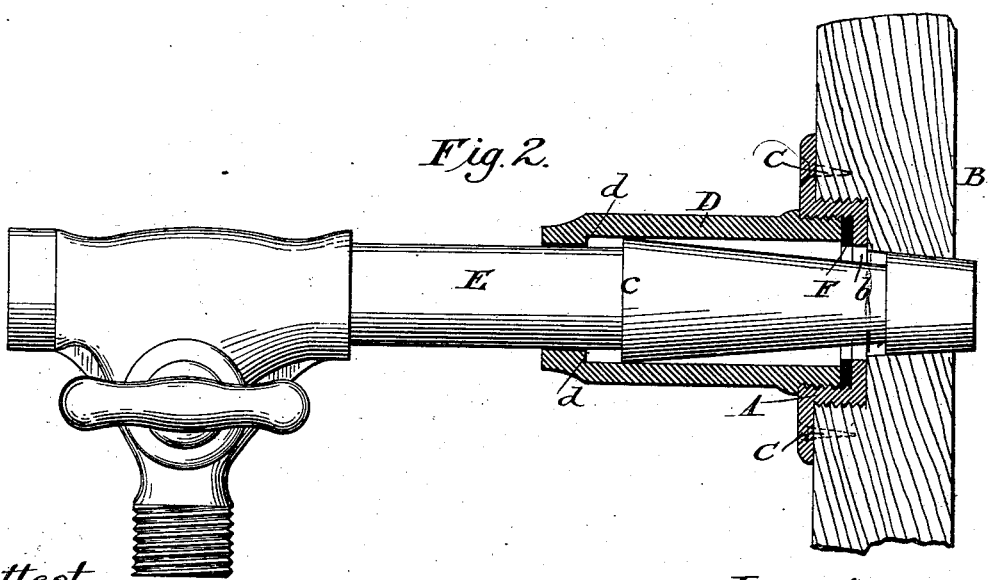

In the accompanying drawings, Figure 1 represents a perspective view of my improved device, partly broken away to show the interior; and Fig. 2, a longitudinal central section through the sleeve and bushing, showing the faucet in position for use.

The object of my invention is primarily to overcome the difficulty, annoyance, and waste incident to the common method of tapping beer and other casks without increasing the time required, and also to prevent the rapid wear and destruction of the cask-head.

With these objects in view, I provide the cask with a metal bushing, A, consisting of a plate having a central depression, a, threaded, as shown, and having an open center, b, encircling the bung-hole and bung, and slightly larger than the latter, as shown, in order that the faucet, when driven to place, may be seated and embedded firmly in the wood, instead of coming into contact with the metal bushing. The depressed portion of the bushing is threaded on its exterior, as shown, to screw into the head B of the cask, and is prevented from being turned out by screws C, passing through the plate and into the wood, as shown. The interior walls of the depression A are also threaded to receive the similarly-threaded end of a sleeve or cylinder, D, within which the faucet E is arranged to slide, as indicated, the faucet being formed with a shoulder, c, to limit its forward or outward movement. When the faucet is at the forward limit of its movement the rear end will be flush with or project slightly beyond the threaded end of the sleeve D, which will then be screwed into the bushing, as shown in Fig. 2, a packing-ring, F, of rubber or other suitable material, being interposed between the end of the sleeve and the bushing, as shown. By then striking the outer end of the faucet with a mallet the bung or plug will be forced in and the faucet will be firmly driven into the hole previously occupied thereby. Should the pressure of the liquid force back the faucet, its outward movement will be limited by the shoulder c coming against the shoulder d of the sleeve, and the faucet will be thus held in position for further blows of the mallet, the beer or liquid being in the meantime prevented from escaping, because the enlarged portion of the faucet fills the interior of the sleeve, as shown. In this way the operation of tapping is rendered simple and easy, and all annoyance, bother, and waste prevented.

In order to protect the threads of the bushing A from becoming filled or clogged up with dirt, &c., I provide a cap, G, which is screwed into the bushing, and which serves also to prevent the accidental removal of the plug or bung.

It will be seen that the bushing serves to protect the bung-hole or opening a against chipping or wear, and avoids the liability of splitting the cask-head, while at the same time, being shallow and extending but a short distance into the head, and its central opening being larger than the bung-hole or opening, the faucet becomes embedded in the wood.

It is apparent that the screw-thread upon the sleeve may be a mutilated instead of a continuous thread, or that beveled lugs may be substituted both in the bushing and on the sleeve, though the continuous thread is preferred.

The sleeve will preferably be made in two parts and riveted together, but may be made with an open side, through which to enter the faucet; or the shoulders c or d may be formed by a ring screwed to place upon the faucet or in the end of the sleeve.

I am aware that a faucet has been provided with a sliding stem to drive in the bung or plug after the faucet is screwed into a bushing, and that screw plugs and valves have been forced back by the entrance of the faucet, and these I do not claim.

I am also aware that an internally-threaded sleeve or tube has been screwed into a larger internally-threaded bushing to prevent the escape of the bung; but, being open at the outer end, such sleeve permitted the entrance of dirt into the bushing, besides reducing the opening or necessitating an enlargement of the entire device. I do not claim such tubular sleeve.

Having thus described my invention, what I claim, is—

1. In combination with a cask, a bushing over and around the tap-hole or bung and having a central opening larger than the bung and provided with a detachable cap, as and for the purpose explained.

2. In combination with a cask having a common plug or bung and an internally-threaded metal bushing encircling the bung, as shown and described, a cap applied to the bushing, as explained, whereby it is adapted to exclude dirt and to prevent the escape of the bung or plug, as set forth.

3. In combination with a beer-faucet provided with a shoulder, $c$, an encircling sleeve, D, provided with a shoulder, $d$, and adapted to be secured to the cask, substantially in the manner explained, the faucet being free to slide without turning within the sleeve.

4. In combination with a cask having bushing A, the faucet E, and threaded sleeve D, provided respectively with shoulders $c$ and $d$, as and for the purpose set forth, the faucet being arranged to slide freely a limited distance within the sleeve.

5. In a beer-tapping device, the combination of a sleeve adapted to be attached to the cask, substantially in the manner explained, and a shouldered faucet arranged, as set forth, to slide a limited distance within the sleeve.

GEORGE HIRSCHMAN.

Witnesses:
AUG. W. CUTLER,
EDWARD C. LYON.